United States Patent
Verhelst

(10) Patent No.: US 7,156,451 B2
(45) Date of Patent: Jan. 2, 2007

(54) HOUSING UNIT WITH SLIDE-OUT, PROVIDED WITH AN AWNING AND AWNING FOR SUCH A HOUSING UNIT

(75) Inventor: Jan Verhelst, Menen (BE)

(73) Assignee: Omnistor Accessories NV, Menen (BE)

( * ) Notice: Subject to any disclaimer, the term of this patent is extended or adjusted under 35 U.S.C. 154(b) by 0 days.

(21) Appl. No.: 10/897,438

(22) Filed: Jul. 23, 2004

(65) Prior Publication Data

US 2005/0035619 A1    Feb. 17, 2005

(30) Foreign Application Priority Data

Jul. 25, 2003    (BE) .................................. 2003/0423

(51) Int. Cl.
*B60P 3/34* (2006.01)

(52) U.S. Cl. .................... 296/163; 296/26.13; 160/67; 135/88.11

(58) Field of Classification Search ............ 296/26.01, 296/26.12, 163, 26.13; 160/66, 67, 68, 69, 160/70, 78, 79; 135/87, 88.01, 88.05, 88.1, 135/88.11, 88.12
See application file for complete search history.

(56) References Cited

U.S. PATENT DOCUMENTS

| | | | |
|---|---|---|---|
| 5,171,056 A * | 12/1992 | Faludy et al. ................ 296/163 |
| 5,280,687 A | 1/1994 | Boiteau | |
| 5,560,667 A | 10/1996 | Edry | |
| 5,752,536 A * | 5/1998 | Becker ........................ 135/88.1 |
| 5,860,440 A | 1/1999 | Murray et al. | |
| 6,048,016 A * | 4/2000 | Futrell et al. ............ 296/26.13 |
| 6,056,350 A * | 5/2000 | Brutsaert ..................... 296/163 |
| 6,269,824 B1 | 8/2001 | Brutsaert | |
| RE37,567 E * | 3/2002 | Murray ........................ 296/163 |
| 6,619,726 B1 * | 9/2003 | Jones ......................... 296/163 |
| 6,729,679 B1 * | 5/2004 | Malott ......................... 296/175 |
| 6,860,544 B1 * | 3/2005 | Malott ......................... 296/175 |
| 6,874,559 B1 * | 4/2005 | Hicks .......................... 160/22 |
| 2002/0092552 A1 * | 7/2002 | Jones ...................... 135/88.01 |
| 2005/0035619 A1 * | 2/2005 | Verhelst ................... 296/26.01 |

* cited by examiner

*Primary Examiner*—Joseph D. Pape
(74) *Attorney, Agent, or Firm*—James Creighton Wray

(57) ABSTRACT

The invention relates to a housing unit (1), such as a caravan or a motor home with an extensible room (3) or slide-out and an awning (7) with a rollable awning canvas (8) attached above this room (3), so that, when sliding out the room (3), the awning canvas (8) will automatically be rolled off above this room (3) until the foremost edge of the awning canvas (8) will have passed the front wall (4) of the slide-out (3), in order to protect this front wall from the sun. Rolling off the awning canvas (8) automatically is preferably caused by the sliding out motion of the slide-out (3). Furthermore, an arm (12), (13) connected to the canvas (8) may be provided, which is rotatably connected to the slide-out and which will be rotated when moving out the slide-out and will take along the awning canvas (8) until it will pass the said front wall (4). This invention likewise relates to an awning (1) provided for such a housing unit (1) and a method to install the awning (7).

14 Claims, 3 Drawing Sheets

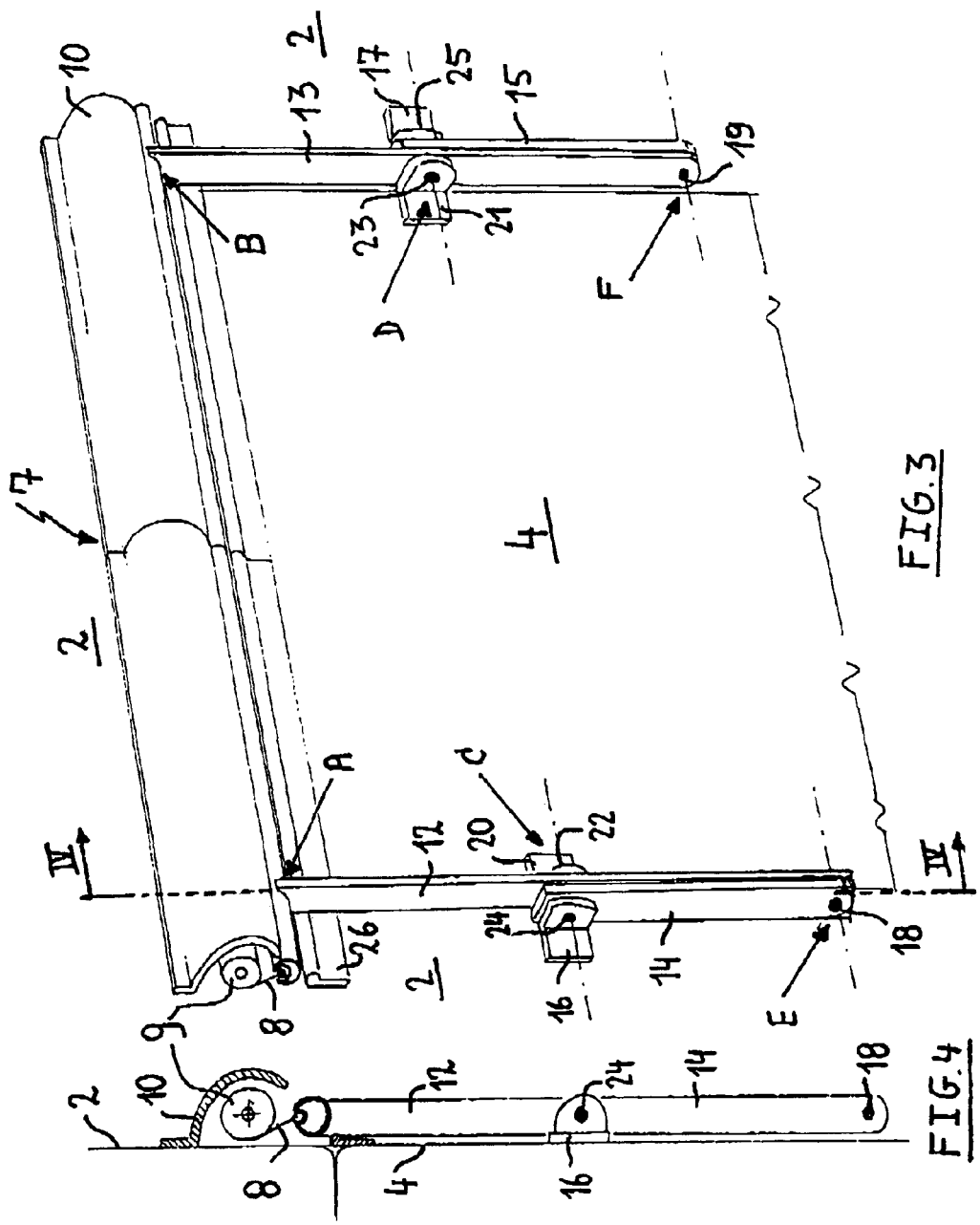

HOUSING UNIT WITH SLIDE-OUT, PROVIDED WITH AN AWNING AND AWNING FOR SUCH A HOUSING UNIT

This application claims the benefit of Belgian Application No. 2003/0423 filed Jul. 25, 2003.

BACKGROUND OF THE INVENTION

For one thing, this invention relates to a housing unit with an extensible room, comprising an awning with a rollable awning canvas attached to the outside of the housing unit above this room, so that when the room is extended, the awning canvas will automatically be unrolled over this room.

In the scope of this invention, the expression "housing unit" is used in the sense of any fixed or movable entity meant to shelter people. More particularly, this invention is focused on movable housing units such as, for instance, caravans, campers, motor homes and boats, irrespective of the fact whether these units have their own engine or have to be moved by means of other vehicles. The so-called leisure vehicles (caravans and motor homes) constitute the most important field of application of this invention.

In this patent application, by the expression extensible room and slide-out is meant any construction, having at least one wall or part of a wall which is movable in order to enlarge the interior part of the room of the housing unit.

This invention likewise relates to an awning with an awning canvas that may be unrolled, provided to be attached to a housing unit in such a manner above one of its extensible rooms that, when extending this room, the awning canvas will automatically unroll above this room.

Finally, this invention likewise relates to a method for attaching or installing an awning with an rollable awning canvas at the outside of a housing unit, so that, when extending the room, the awning canvas will automatically be unrolled above this room.

Caravans and motor homes provided with an extensible room in order to be able to increase the inside living space, are generally known. The extensible room, called slide-out, is a slidable whole mainly consisting of a front wall, two parallel side walls practically at right angles to this front wall and a bottom and an upper wall closing off the whole at top and bottom. Through an opening in a sidewall of the caravan or the motor home, this whole part can be slid out. In the slid-in position, the sidewalls, the bottom wall and the upper wall are mainly in the inner space of the caravan or the motor home and the front wall of the slide-out are closing off the said opening. In the extended position of the slide-out, its walls are mainly outside the inner space of the caravan or motor home and they enclose a space, which joins up with the inner space of the caravan or the motor home. In this way, the housing space may be considerably increased and an additional sitting area may be provided in the caravan or in the motor home, for instance.

The slide-out is brought into the slid-in position in order to be able to move the motor home or caravan. Sliding in and out occurs by means of a driving motor provided for that purpose and by means of known transmission and guiding means. Such a slide-out is described in he American patent U.S. Pat. No. 5,634,683.

It is likewise known to install an awning above such a slide-out with an awning canvas which may be unrolled from an awning roller to be attached to the outer wall of the caravan or of the motor home, and to connect this awning canvas to the slide-out in such a manner that it will be unrolled by the extending motion of the slide-out. When the slide-out is in the slid-in position, the awning canvas is completely rolled up. In the extended position of the slide-out, the awning canvas is completely unrolled above the slide-out. The awning roller being attached to the fixed outer wall of the caravan or of the motor home, whereas the free edge of the awning canvas is connected to the slide-out. Constructions are also known where the awning roller and the awning canvas are connected in an inverse manner and where the awning roller therefore is attached to the slide-out and where the free edge of the canvas above the slide-out is attached to the wall of the caravan or of the motor home.

However, these known awning arrangements have the disadvantage that the awning canvas in its unrolled position does not protect the front wall, and the windows, which may be provided, from the sun. In order to obtain such a protection it is known to provide a separate awning canvas that may be folded down or unrolled. This makes the awning arrangement more complicated and more expensive. Moreover, this additional awning canvas has to be unrolled or folded down manually, which makes the construction also less user-friendly.

SUMMARY OF THE INVENTION

The purpose of this invention is to provide such a housing unit with slide-out and awning not having the disadvantages mentioned and, more particularly, to provide such a housing unit with a simple awning that is user-friendly, comprising an awning canvas which may be unrolled automatically above the slide-out, whereas a sunshade for the front wall of the slide-out, and the windows which may possibly be provided there, may be provided as well.

This objective is obtained by providing a housing unit with an extensible room, comprising an awning with a rollable awning canvas attached at the outside, above this room, so that when extending this room, the awning canvas will be automatically unrolled above this room and where, according to his invention, means have been provided to unroll the awning canvas automatically until the front edge of the awning canvas will have passed the foremost wall of the room.

In this case, the awning canvas may be unrolled by means of the driving means of the awning canvas of the slide-out or by using separate means. Then, for instance, the driving means are automatically controlled in consequence of the operating action necessary to move out the slide-out. For instance, by pushing the button controlling the driving motor of the slide-out to move out the slide-out, automatically the driving motor of the awning is likewise activated in order to unroll the awning canvas until it has reached the position desired. It will be obvious that the awning canvas should have a sufficient length so that it may reach this position beyond the front wall of the slide-out.

Such an awning arrangement may be realized with the help of very simple means. Because the awning canvas is unrolled until it is extending beyond the front wall of the slide-out, a sunshade is created for this front wall. This occurs in an entirely automatic manner, so that a very user-friendly awning arrangement is obtained.

When realizing such a housing unit a roller to take up the awning canvas may be attached to the fixed exterior surface of the housing unit, so that the awning canvas, under the influence of a tractive force, for instance, may be unrolled from this fixed roller. Of course, it may be decided to choose for an inverted arrangement and to attach the canvas to the fixed outside surface (or another fixed part), whereas the roller may be moved to unroll the awning canvas. It will be obvious that both alternative arrangements are equivalent solutions. With the second alternative, the said front edge of the awning canvas is formed on the side of the roller, and the most important effect of the present invention is obtained when this side of the awning canvas and/or the parts attached to it (for instance, the roller itself) are moved until they have passed the front edge of the slide-out.

In a preferred embodiment of a housing unit according to the present invention, automatic unrolling of the awning canvas is caused by the sliding-out motion of the room. With such a construction, no additional driving means to unroll the awning canvas are required.

This may be realized, for instance, by attaching a roller to take up the awning canvas to the outside of the housing unit and to attach the awning canvas to the slide-out or by attaching the roller to the slide-out and the awning canvas to the said outside.

In a very advantageous embodiment of a housing unit according to the present invention, the embodiment comprises an arm connected to the awning canvas in a first connecting point and is rotatably connected to the room in a second connecting point and moving the room in the direction of the motion will cause a rotation of the said arm, because of which the awning canvas is taken along by the arm and will be unrolled until its front edge has passed the front wall of the room. Such an embodiment may be realized with the help of very simple means. Moreover, this mechanism may be installed very easily and is very reliable.

Preferably, in a third connecting point, the said arm is connected to a fixed part, the second connecting point being situated between the first and the third connecting point, so that, as a consequence of the room moving in the sliding out direction, the arm is rotated around an axis near the second connecting point and is exerting a lever action on the awning canvas causing the awning canvas to be unrolled until it has passed the front edge of the room.

As it should be possible to modify the distance between the said fixed part and the third connecting point of the arm when moving the slide-out, the arm is designed, for instance, as an arm having a variable length, such as a telescopic arm, or the arm is connected to a fixed part by means of one or several intermediate and in a mutually hinged manner interconnected elements.

Preferably, in the third connecting point, the said arm is rotatably connected to a connecting slat, which itself is likewise rotatably connected to a fixed part of the housing unit.

Preferably the awning also comprises a roller that is attached to the housing unit above the extensible room, whereas the awning also comprises at least one springy element exerting a torque on the said roller in the direction of rotation, which causes the awning canvas to be rolled up.

This roller may be provided within a casing the bottom of which is open in order to allow the awning canvas to pass. Furthermore, the extensible room my likewise comprise a supporting slat for the awning canvas extending from the top. When the slide-out is moving out and when unrolling the awning canvas, the awning canvas will rest on this supporting slat, which, preferably, has a rounded upper edge.

In its most preferred embodiment, the housing unit according to the present invention is part of a whole that is movable, such as, for instance, a caravan or a motor home.

The above-mentioned purpose of the present invention is likewise obtained by providing an awning with a rollable awning canvas, provided to be attached to the outside of a housing unit, above an extensible room of it, so that when extending the room, the awning canvas will automatically be unrolled above this room and the awning being provided to automatically unroll when extending the room until the front edge of the awning canvas has passed the front wall of the room.

Consequently, such an awning falls within the scope of the present invention and, as a separate device, together with the provisions mentioned above, is likewise covered by the extent of the protection of the present patent.

When installing such an awning, one has, of course, the choice both to attach a roller for taking up the awning canvas to the fixed outside of the housing unit, so that the awning canvas may be rolled from this roller and to attach the canvas to this fixed outside, while the roller is movable (for instance, is connected to the slide-out) in order to unroll the awning canvas.

Such an awning, designed to be installed in such a manner that automatically unrolling the awning canvas is caused by the sliding motion of the room, is preferred. Moreover, it is possible to apply any one of the above-mentioned alternatives at will.

Other particular features of the awning according to the present invention may be deduced from the characteristics of the housing unit according to the present invention mentioned above and are described in the claims 12 to 16.

Also a method to attach an awning with a rollable awning canvas to the outside of a housing unit with an extensible room, so that, when extending the room, the awning canvas will be unrolled automatically above this room and where at the same time provisions are made that this awning canvas, when moving out the slide-out, will be unrolled automatically until its foremost edge has passed the front wall of the room, falls within the scope of the present invention.

Preferably, when applying this method, means should be provided to have the awning canvas unrolled by the motion for moving out the slide-out. A number of preferred means have been described above and represented on the drawings.

In the following, a preferred embodiment of a caravan with an extensible room (slide-out) provided with an awning according to the present invention, a detailed description is given by way of example. The only purpose of this description is to further clarify the invention. It may be obvious therefore, that nothing in this description may be considered to be a reason for a restrictive interpretation of the scope of the protection defined in the claims. In this description reference is made to the attached figures of which:

BRIEF DESCRIPTION OF THE DRAWINGS

FIG. 1 is a perspective view of a caravan according to the present invention, the slide-out of which has been fully pushed in;

FIG. 3 is an enlarged perspective view of the awning of the caravan of FIG. 1, the awning canvas of which has been rolled up, FIG. 4 is a cross-section according to the line IV—IV in FIG. 3.

DETAILED DESCRIPTION OF THE PREFERRED EMBODIMENTS

Figure 1:
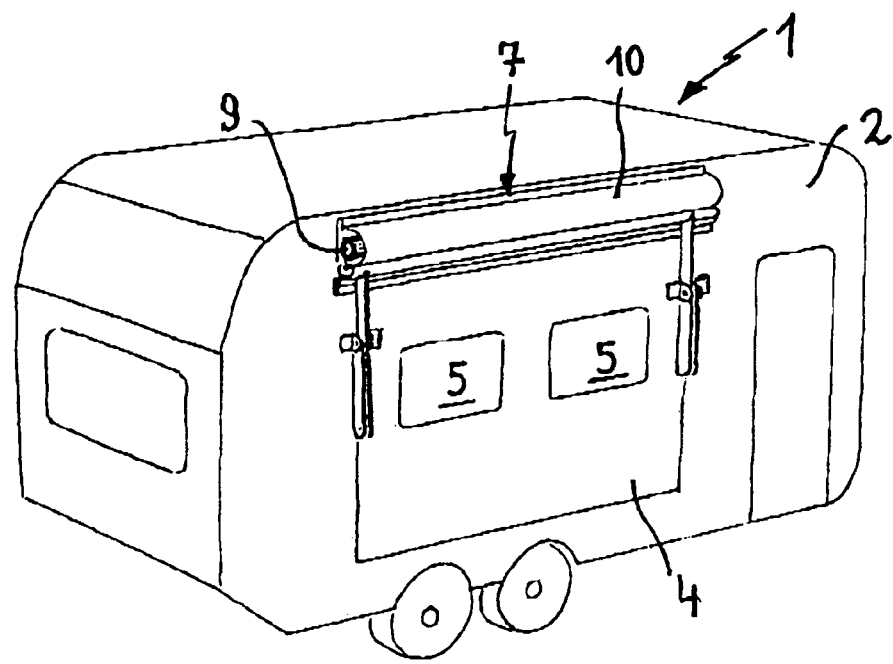
Figure 2:
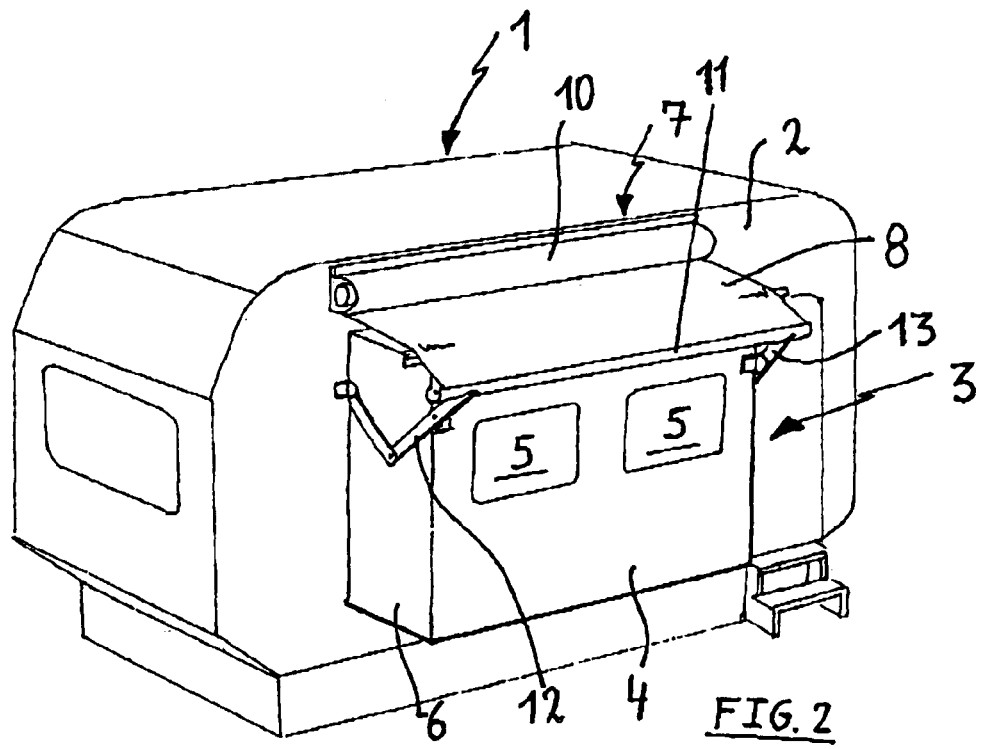
FIG. 2 is a perspective view of the caravan of FIG. 1, in a situation ready for use in which the slide-out is in a moved out position.
Figure 5:
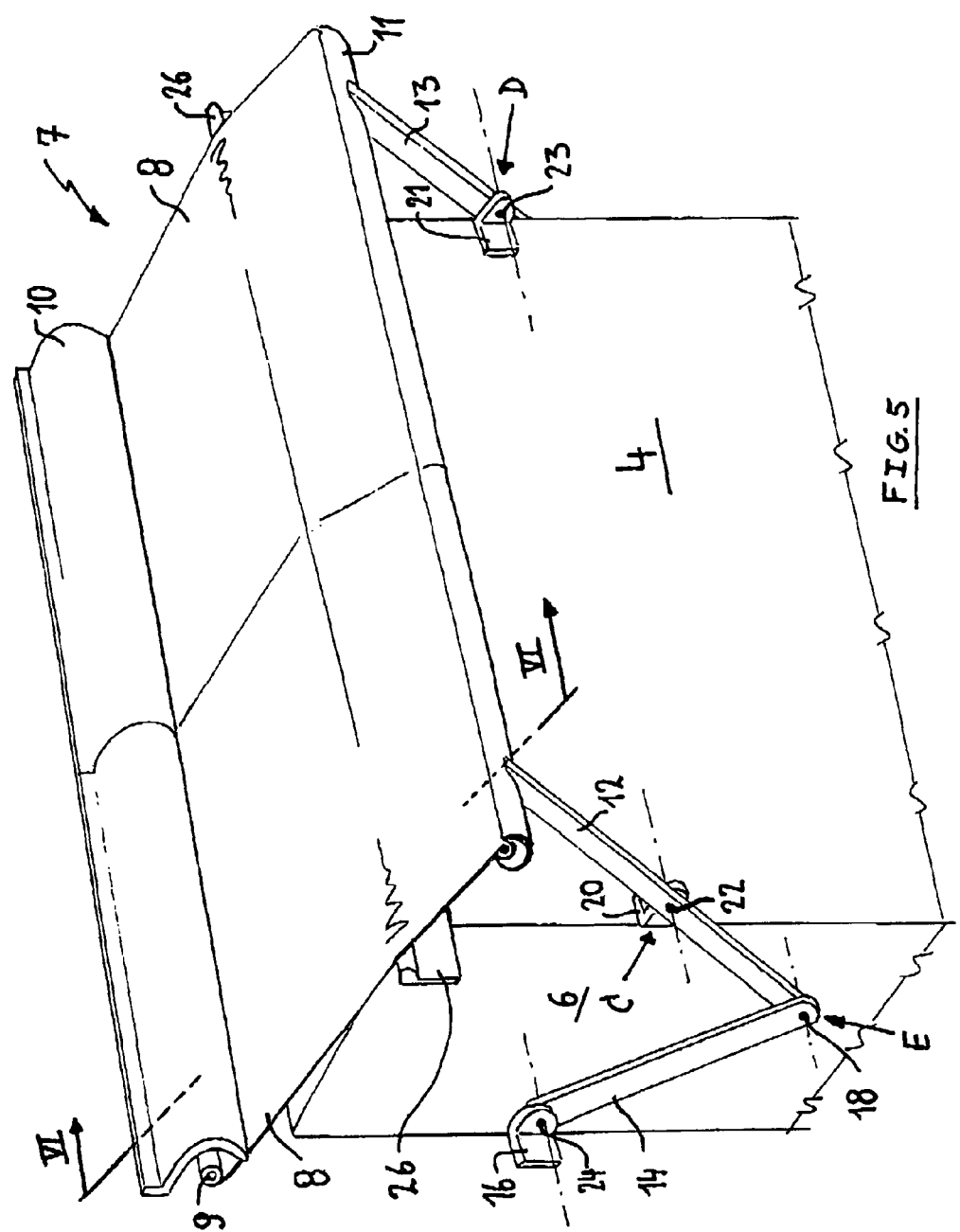
FIG. 5 is an enlarged perspective view of the awning of the caravan of FIG. 2, the awning canvas of which has been rolled up and the slide-out having been moved out.

The caravan (1) represented in the FIGS. 1 and 2 has an extensible room (3) or slide-out, which may be moved out through an opening in a sidewall (2) of the caravan (1). However, this slide-out (3) may be provided in any other wall (for instance, in the back of the caravan), and be equipped with an awning according to the present invention.

This slide-out (3) has a front wall (4) in which two windows (5) have been provided, two parallel sidewalls (6), a bottom and a top wall. In the pushed-in position (see FIG. 1), the side walls (6), the bottom and top walls are essentially situated within the inner space of the caravan (1) and the opening in the side wall (2) of the caravan (1) is closed off by the front wall (4).

When the slide-out (3) has been moved out (see FIG. 2) the side walls (6), the bottom and the top walls extend outside the caravan (1) and, together with the front wall (4), they enclose a space connecting with the inner space of the caravan (1), thus increasing the living space of the caravan (1).

Furthermore, the caravan (1) is also equipped with an awning (7). It comprises an awning canvas (8) with a width slightly larger than the width of the slide-out (3), and a roller (9) of a suitable length to roll up this awning canvas (8). This roller (9) is provided with a torsion spring (not visible on the drawings) that is stretched when unrolling the awning canvas and thus exerting a torque on the roller (9), the direction of rotation of which is corresponding to the direction of rotation of the roller (9) and because of which the awning canvas (8) is taken up by the roller (9).

Above the slide-out (3), the roller (9) is attached to the sidewall (2) of the caravan (1), so that both ends of this roller (9) are extending past the parallel sidewalls (6) of the slide-out (3), and so that the unrolled awning canvas (8) may extend above this slide-out (3) right across the width of the slide-out (3). A casing (10), closed off at front, top and sides, is enveloping this roller (9). The awning canvas (8) extends from the roller (9) outside the casing through an opening in the bottom of this casing (10).

Across its width, the free edge of the awning canvas (8) (the foremost edge) is contained in a sectional element (11), which, near its two extremities, is connected to a respective arm (12),(13) by means of known connecting means. In FIG. 3, the points where these arms (12),(13) are connected to the sectional element (11) of the awning canvas (8) are indicated by the references (A) and (B).

The arms (12),(13) extend downwards and are in turn rotatably connected to an extremity of a respective connecting slat (14),(15), by means of pins (18),(19). At their other extremities, these connecting slats (14),(15) are rotatably connected to a respective L-shaped connecting sectional element (16),(17), by means of pins (24),(25), while on both sides of the slide-out these connecting sectional elements (16),(17) are attached to the said side wall (2) of the caravan (1). The points where the arms (12),(13) are connected to their respective connecting slats (14),(15) are indicated in FIG. 3 by the references (E) and (F).

Both arms (12),(13) are also rotatably connected to the slide-out (3). These connecting points are indicated in FIG. 3 by the references (C) and (D). The arms (12),(13) are connected to respective L-shaped connecting sectional elements (20),(21) by means of the respective pins (22),(23), while these connecting sectional elements (20),(21) are attached to the front wall (4) of the slide-out (3), along its upright edges. For each arm (12),(13), these connecting points (C),(D) are situated approximately in the middle between the connecting points (A),(B) (where the arms of the awning canvas sectional element (11) are connected) and the connecting points (E),(F) (where the arms are connected to the connecting slats (14),(15)).

When the slide-out (3) has been pushed in (see FIGS. 3 and 4), the sectional element (11) is situated under the opening in the casing (10) and closes off this opening more or less. In this position the arms (12),(13) and the connecting slats (14),(15) connected to them are situated in a practically vertical position.

To pull out the slide-out (3) a driving motor is engaged (not represented in the drawings). By moving the slide-out (3), the arms (12),(13) are taken along by the slide-out (3) that is moving out on the one hand (in the points (C) and (D)) and retained by the connecting slats (14),(15) connected to them (in the points (E) and (F) which are connected to the fixed side wall (2) of the caravan (1) on the other hand. This causes the arms (12),(13) to rotate around the pins (22),(23) near the connection (C),(D) with the slide-out (3) into an inclined position. In this inclined position, the parts of the arms (12),(13) pointing upwards from the pins (22),(23), are situated beyond the vertical plane of the front wall (4) (seen from the inner space of the caravan) of the slide-out (3), so that the sectional element (11) of the awning canvas (8) connected to the upper extremities of these arms (12),(13) is likewise taken along until it has passed the front wall (4) of the slide-out (3) and the awning canvas (8) will unroll a far as that. The respective arms (12),(13) and connecting slats (14),(15) then extend, forming an angle, on both sides of the slide-out (3) next to its parallel sidewalls (6).

Along the upper edge of the front wall (4) of the slide-out (3), a horizontal supporting slat (26) is attached, the upper edge of which is rounded, which extends above the front wall (4). When unrolling the awning canvas (8) this canvas (8) rests on this rounded edge.

Pushing in the slide-out (3) occurs by means of a driving motor. Because the slide-out (3) is moved, the arms are rotated back into their vertical position and the sectional element (11) is moved in the direction of wall (2) of the caravan. This means that the awning canvas (8) may be taken up automatically by the roller (9) rotating in the taking-up direction under the influence of the torsion spring.

With this caravan (1), because of the moving-out motion of the slide-out (3), the awning canvas (8) is automatically unrolled until its front edge has passed the front wall (4) of the slide-out (3). Such an awning arrangement is particularly user-friendly and automatically realizes a sunshade for the front wall (4) and the windows (5) that may be provided in that wall of the slide-out (3) of the caravan (1), with a minimum of additional means.

The invention claimed is:

1. Housing unit with an extensible room, comprising an awning with rollable awning canvas attached to the outside of the housing unit above this room, so that when sliding out the room, the awning canvas will be rolled out above this room, wherein means have been provided to automatically unroll the awning canvas until the foremost edge of the awning canvas has passed the front wall of the room, wherein automatically rolling off the awning canvas is caused by the sliding-out motion of the room, wherein the housing unit comprises an arm which, in a first connecting point is connected to the awning canvas and in a second connecting point is rotatably connected to the room and in that moving the room in the sliding-out direction will cause a rotation of the said arm, causing the awning canvas to be taken along by the arm and will be rolled off until its foremost edge has passed the front wall of this room.

2. Housing unit according to claim 1, wherein the said arm, in a third connecting point, is connected to a fixed part, the second connecting point-being situated between the first and the third connecting point, so that moving the room in the sliding-out direction, will cause the arm to be rotated around an axis near the second connecting point, exerting a lever action on the awning canvas, causing the awning canvas to be rolled of until it has passed the front wall of the room.

3. Housing unit according to claim 2, wherein the said arm, in the third connecting point is rotatably connected to a connecting slat which is rotatably connected to a fixed part of the housing unit.

4. Housing unit according to claim 1, wherein the awning comprises a roller that is attached to the housing unit above the extensible room and in that the awning comprises at least one springy element exerting a torque on the said roller in the direction of rotation by which the awning canvas is rolled up.

5. Housing unit according to claim 1, wherein the awning comprises a roller that is attached to the housing unit above the extensible room and in that this roller is contained in a casing, which is open at the bottom in order to let through the awning canvas.

6. Housing unit according to claim 1, wherein the extensible room comprises a supporting slat, extending at the top, for the awning canvas.

7. Housing unit according to claim 1, wherein it is part of a whole, which is movable, a caravan or a motor home.

8. Awning with a rollable awning canvas provided to be attached to the outside of a housing unit above an extensible room, so that when sliding out the room, the awning canvas will automatically be rolled off above this room, wherein the awning is designed to roll off the awning canvas automatically, when moving out the room, until the foremost edge of the awning canvas will have passed the front wall of the room, wherein the awning has been provided to be installed in such a manner that unrolling the awning canvas, will be caused automatically by sliding out the room, wherein the awning comprises an arm provided to be connected to the awning canvas in a first connecting point, and to be rotatably connected to the room in a second connecting point and in that the awning has been provided to be installed in such a manner that moving the room in the sliding-out direction will cause a rotation of the said arm, because of which the awning canvas will be taken along by the arm and rolled off until its foremost edge will have passed the front wall of the room.

9. Awning according to claim 8, wherein the said arm has been provided to be connected to a fixed part in a third connecting point, the second connecting point being situated between the first and the third connecting point, so that, when moving the room, the arm is caused to be rotated in the sliding-out direction around an axis near the second connecting point and will exert a lever action on the awning canvas causing the awning canvas to be rolled off until it has passed the front wall of the room.

10. Awning according to claim 9, wherein the said arm, in the third connecting point, is rotatably connected to a connecting slat which is provided to be rotatably connected to a fixed part of the housing unit.

11. Awning according to claim 9, wherein it comprises a roller and at least one springy element exerting a torque in the direction of rotation on the said roller, causing the awning canvas to be rolled up.

12. Awning according to claim 9, wherein it comprises a roller that is contained in a casing, which is open at the bottom in order to let through the awning canvas.

13. Housing unit with an extensible room, comprising an awning with rollable awning canvas attached to the outside of the housing unit above this room, so that when sliding out the room, the awning canvas will be rolled out above this room, wherein means have been provided to automatically unroll the awning canvas a foremost edge of the awning moving with respect to a front wall of the room until the foremost edge of the awning canvas has passed the front wall of the room, an arm connected to the awning canvas at a first connecting point and rotatably connected to the extensible room at a second connecting point wherein moving the extensible room in the sliding out direction causes a rotation of said arm, which causes the awning canvas to be taken along by the arm and the awning canvas to be rolled off until a foremost edge of the awning canvas passes a front wall of the extensible room.

14. An awning according to claim 8 further comprising the arms connected to the awning canvas at a first connecting point and rotatably connected to the extensible room at a second connecting point, wherein the awning is installed such that moving the extensible room in a sliding out direction causes rotation of the arm, which causes the awning canvas to be taken along by the arm and the awning canvas to roll off until a foremost edge passes a front wall of the extensible room.

* * * * *